(12) United States Patent
Willett (10) Patent No.: US 11,635,339 B2
(45) Date of Patent: Apr. 25, 2023

(54) GAS LEAKAGE MONITORING SYSTEM (71) Applicant: Honeywell International Inc., Morris Plains, NJ (US)

(72) Inventor: Martin John Willett, Waterlooville (GB)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 305 days.

(21) Appl. No.: 16/818,687

(22) Filed: Mar. 13, 2020

(65) Prior Publication Data
US 2021/0285840 A1  Sep. 16, 2021

(51) Int. Cl.
*F24F 11/36* (2018.01)
*G01M 3/04* (2006.01)
*F25B 49/00* (2006.01)

(52) U.S. Cl.
CPC ............. *G01M 3/04* (2013.01); *F24F 11/36* (2018.01); *F25B 49/005* (2013.01); *F25B 2500/222* (2013.01)

(58) Field of Classification Search
CPC ......... G01M 3/04; F24F 11/36; F25B 49/005; F25B 2500/222
See application file for complete search history.

(56) References Cited

U.S. PATENT DOCUMENTS

| 4,890,459 | A | 1/1990 | Havemann |
| 6,840,086 | B2 | 1/2005 | McCoy et al. |
| 9,021,866 | B2 | 5/2015 | Takano et al. |
| 2006/0257288 | A1* | 11/2006 | Sun ..................... G01N 27/404 422/89 |

(Continued)

FOREIGN PATENT DOCUMENTS

| CN | 106645295 A | 5/2017 |
| EP | 0075835 A2 | 4/1983 |

(Continued)

OTHER PUBLICATIONS

KR 2009060798 (English Translation) (Year: 2009).*

(Continued)

*Primary Examiner* — Jonathan Bradford
(74) *Attorney, Agent, or Firm* — Alston & Bird LLP (57) ABSTRACT

Various methods and apparatuses are provided for monitoring and detecting gas leaks. A method of determining a gas leak with a sensor assembly is provided. The sensor assembly includes a primary sensing device and a reference sensing device. The method includes receiving, via the primary sensing device, a first oxygen concentration level reading of a given area. The method also includes receiving, via the reference sensing device, a second oxygen concentration level reading of the given area. The method further includes comparing the first oxygen concentration level reading and the second oxygen concentration level reading. Based on the comparison, the method still further includes causing a transmission of a signal that a gas leak is occurring in an instance in which the first oxygen concentration level reading and the second oxygen concentration level reading have a difference greater than a threshold difference. A corresponding gas detection apparatus is also provided.

18 Claims, 7 Drawing Sheets

(56) References Cited

U.S. PATENT DOCUMENTS

2016/0245193 A1* 8/2016 Makled .............. F02D 19/084
2017/0198936 A1* 7/2017 Yamaguchi .......... F25B 49/02

FOREIGN PATENT DOCUMENTS

KR 20160066367 A * 6/2016
WO 2019/198134 A1 10/2019

OTHER PUBLICATIONS

Chemours, Safety Data Sheet, Opteon XL41 (R-454B) Refrigerant, [online] [retrieved May 12, 2020] retrieved from the Internet URL: https://www.climalife.co.uk/docs/Opteon-XL41-R454B-MSDS-v3.4.pdf, 18 pages.

Chemours, Safety of Opteon XL Refrigerants, 2016, [online article] [retrieved May 29, 2020] retrieved from the Internet URL: https://www.opteon.com/en-/media/files/opteon/safety-of-opteon-xl-en.pdf, 10 pages.

City Technology, Product Characterisation Note for 4OxLL Oxygen CiTiceL, [online] [retrieved on May 28, 2020] retreived from the internet URL: https://www.citytech.com/en-gb/, 24 pages.

City Technology, Product Datasheet for 4OxLL Longlife Oxygen CiTiceL, [online] [retrieved on May 28, 2020] retreived from the internet URL: https://www.citytech.com/en-GB/, 3 pages.

Le Neindre et al., Measurements of the Thermal Conductivity of HFC-32 (Difluoromethane) in the Temperature Range from 300 to 465 K at Pressures up to 50 MPa, 2000, [online article] [retrieved May 28, 2020] retrieved from the internet URL: https://www.researchgate.net/publication/251289251, 22 pages.

Makhnatch, Research Focused on Safe Use of Combustible Refrigerants, [online article] [retrieved May 28, 2020] retrieved from the Internet URL: https://www.energy.kth.se/applied-thermodynamics/project-groups/koldmedier-med-lag-gwp/low-gwp-news/forskning-med-fokus-pa-saker-anvandning-av-brannbara-koldmedier-1.835565#mainContent, 4 pages.

Olfert et al., Acoustic Method for Measuring the Sound Speed of Gases Over Small Path Lengths, 2007 [online article] [retrieved May 12, 2020] retrieved from the Internet URL: https://pdfs.semanticscholar.org/c9c3/ffd242878e156a3f41498067f4d34b2bad29.pdf, 8 pages.

Opteon Refrigerants for Stationary AC and Heat Pumps, [online] [retrieved May 28, 2020] retrieved from the Internet URL: https://www.opteon.com/en/industries-applications/stationary-air-conditioning-heat-pumps#main, 2 pages.

Refcom. Technical Bulletin, TB/033: Working With Lower Flammabililty Refrigerants, [online] [retrieved May 12, 2020] retrieved from the Internet URL: https://www.refcom.org.uk/media/1221/tb_033_refcom-final-amended-table.pdf, 10 pages.

Takaka et al., Gaseous Thermal Conductivity of Difluoromethane (HFC-32), Pentafluoroethane (HFC-125), and Their Mixtures, 1995, [online article] [retrieved May 28, 2020] retrieved from the Internet URL: https://rd.springer.com/article/10.1007/BF01438963#article-info, 4 pages.

Extended European Search Report issued in European Application No. 21159736.4 dated Jul. 22, 2021, 8 pages.

Communication about intention to grant a European patent received for European Application No. 21159736.4, dated Nov. 29, 2022, 6 pages.

* cited by examiner

GAS LEAKAGE MONITORING SYSTEM

TECHNOLOGICAL FIELD

An example embodiment relates generally to a method and associated gas detection apparatus of monitoring for gas leaks and, more particularly, to a method and associated gas detection apparatus for monitoring and detecting gas leaks.

BACKGROUND

Refrigeration units include refrigerant coils that contain flammable refrigerants. Due to the flammability of the refrigerants, leaks may be dangerous and therefore need to be detected before a sufficient amount leaks causing the potential for explosions. Through applied effort, ingenuity, and innovation, many of these identified problems have been solved by developing solutions that are included in embodiments of the present disclosure, many examples of which are described in detail herein.

BRIEF SUMMARY

The illustrative embodiments of the present disclosure relate to monitoring and detecting gas leaks. In an example embodiment, a method of determining a gas leak with a sensor assembly is provided. The sensor assembly includes a primary sensing device and a reference sensing device. The method includes receiving, via the primary sensing device, a first oxygen concentration level reading of a given area. The method also includes receiving, via the reference sensing device, a second oxygen concentration level reading of the given area. The method further includes comparing the first oxygen concentration level reading and the second oxygen concentration level reading. Based on the comparison, the method still further includes causing a transmission of a signal that a gas leak is occurring in an instance in which the first oxygen concentration level reading and the second oxygen concentration level reading have a difference greater than a threshold difference.

In some embodiments, the reference sensing device includes a gas filter configured to screen out one or more target gases from reaching the reference sensing device. In some embodiments, the primary sensing device is positioned at a first position and the reference sensing device is positioned at a second position. In such an embodiment, the first position is proximate to a potential leak source and the second position is distant to the potential leak source. In some embodiments, the primary sensing device is positioned at a first position and the reference sensing device is positioned at a second position. In such an embodiment, the first position and the second position are equidistance to a potential leak source. In some embodiments, the sensor assembly is disposed in a refrigeration unit.

In some embodiments, the primary sensing device and the reference sensing device are disposed within a sensor assembly housing. In some embodiments, the threshold difference is based on between 5% and 10% of the volume of oxygen concentration level. In some embodiments, the threshold difference is based on a flammability level of the gas. In some embodiments, the gas is a refrigerant. In some embodiments, the method also includes receiving one or more environmental variables and correcting the first oxygen concentration level reading and the second oxygen concentration level reading based on the environmental variables.

In some embodiments, the method is carried out via at least one processor. In some embodiments, the sensor assembly is a fully analog system.

In another example embodiment, a gas detection apparatus for determining a composition of one or more gases is provided. The gas detection apparatus includes a sensor assembly including a first gas sensor and a second gas sensor. The gas detection apparatus is configured to receive, via the primary sensing device, a first oxygen concentration level reading of a given area. The gas detection apparatus is also configured to receive, via the reference sensing device, a second oxygen concentration level reading of the given area. The gas detection apparatus is further configured to compare the first oxygen concentration level reading and the second oxygen concentration level reading. Based on the comparison, the gas detection apparatus is still further configured to cause a transmission that a gas leak is occurring in an instance in which the first oxygen concentration level reading and the second oxygen concentration level reading have a difference greater than a threshold difference.

In some embodiments, the reference sensing device includes a gas filter configured to screen out one or more gases from reaching the reference sensing device. In some embodiments, the primary sensing device is positioned at a first position and the reference sensing device is positioned at a second position. In such an embodiment, the first position is proximate to a potential leak source and the second position is distant to the potential leak source. In some embodiments, the primary sensing device is positioned at a first position and the reference sensing device is positioned at a second position. In such an embodiment, the first position and the second position are equidistance to a potential leak source.

In some embodiments, the sensor assembly is disposed in a refrigeration unit. In some embodiments, the primary sensing device and the reference sensing device are disposed within a sensor assembly housing. In some embodiments, the threshold difference is based on between 5% and 10% of the volume of oxygen concentration level. In some embodiments, the threshold difference is based on a flammability level of the gas. In some embodiments, the gas is a refrigerant. In some embodiments, the gas apparatus is also configured to receive one or more environmental variables and correcting the first oxygen concentration level reading and the second oxygen concentration level reading based on the environmental variables. In some embodiments, the gas detection apparatus also includes at least one processor, the at least one processor having computer coded instructions therein, with the computer instructions configured to, when executed, cause the operations of the gas detection apparatus. In some embodiments, the gas detection apparatus is a fully analog system.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Having thus described certain example embodiments of the present disclosure in general terms, reference will here- inafter be made to the accompanying drawings, which are not necessarily drawn to scale, and wherein:

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being generated, processed, transmitted, received, and/or stored in accordance with embodiments of the present disclosure. Thus, use of any such terms should not be taken to limit the spirit and scope of embodiments of the present disclosure.

Various embodiments discussed herein allow for monitoring and detection of gas leaks, such as in refrigeration units during operation. Refrigeration units include closed-loop refrigerant coils that contain flammable refrigerants. In some examples, such refrigerant include safety class A2L refrigerants, R-410A, R-1234yf, R-1234ze, R-32, R-454A, R-404A, R-454C, R-455A, R-447A, R-452B, R-454B and/or the like. A2L refrigerants are being used more often in such refrigeration units due to a lower global warming potential (GWP) and therefore regulations have been put into place in various countries to monitor leakage to avoid dangerous conditions during use. While A2L refrigerants have generally low toxicity and only mild flammability, large leaks can still cause dangerous situations. Therefore, monitoring and detection of such leaks are, in some examples, necessary for refrigerant units. Various example embodiments of the present disclosure allow for a simple, yet effective leakage monitoring system. Additionally, as the monitoring system may continuously receive outputs from the sensors used, the monitoring system allows for a self-check feature to be verify that the monitoring system is operational.

While various embodiments discuss refrigeration units, various embodiments discussed herein may also be used for other types of gas leaks, such as in heating, ventilation, and air conditioning (HVAC) applications, fire suppression systems, and/or the like using closed-loop cycles. For example other such examples include, but are not limited to inert gas leaks, natural gas leaks, propane gas leaks, butane gas leaks, carbon monoxide gas leaks, hydrocarbon gas leaks, and/or the like. Various embodiments discussed herein allow for detection of large-scale leaks. For example, gas leaks at or above approximately 1% volume per volume.

Example Gas Detection Apparatus Configuration

Figure 1:
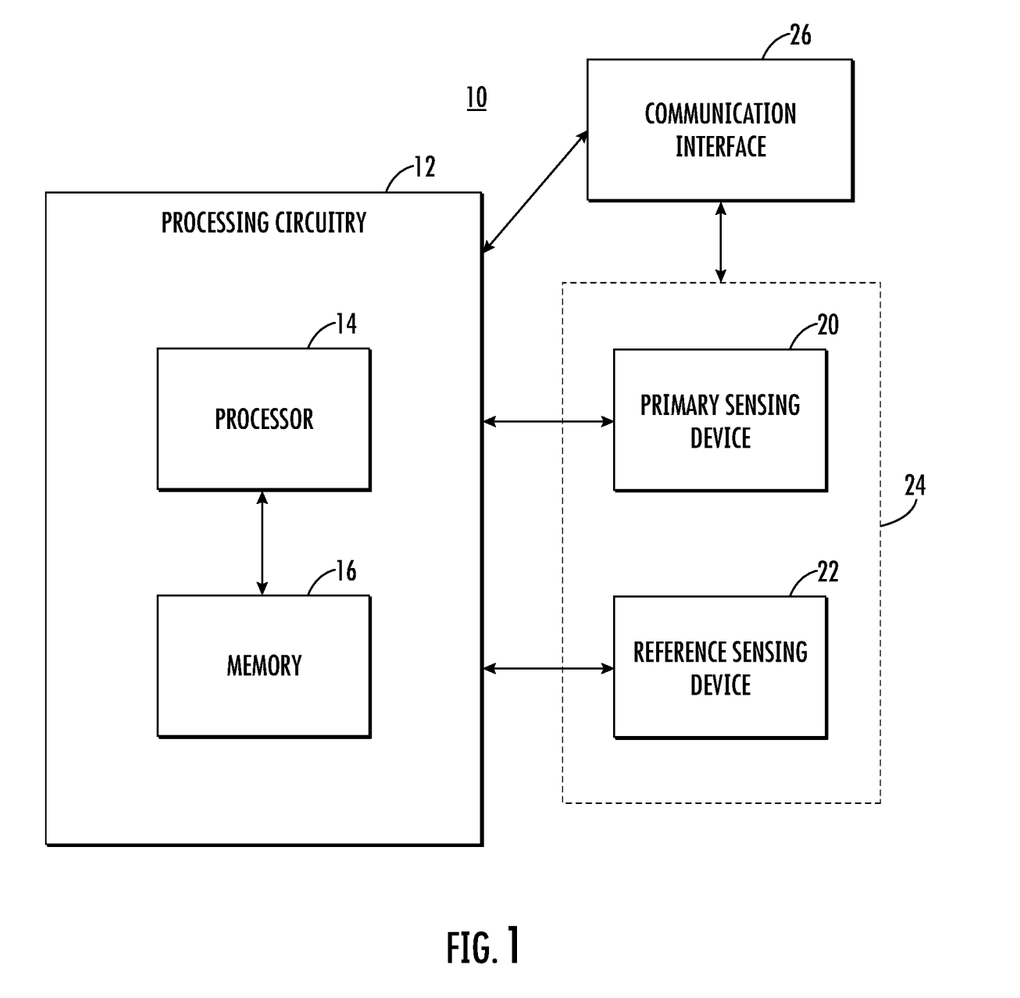
FIG. 1 is a block diagram of a gas detection apparatus configured in accordance with an example embodiment of the present disclosure.

FIG. 1 is a schematic diagram of an example gas detection apparatus configured for performing operations as described herein. Gas detection apparatus 10 is an example embodiment that may be embodied by or associated with any of a variety of computing devices that include or are otherwise associated with a device configured for providing advanced sensory features, which may include a sensor assembly 24. For example, gas detection apparatus 10 may be embodied as a plurality of oxygen concentration sensors configured for detecting the concentration of oxygen within a gaseous fluid (e.g., air). In various embodiments, as discussed below, the oxygen concentration sensors may be an electrochemical oxygen pump configured to monitor oxygen concentration. For example, one or more of the oxygen concentration sensors may be a fuel-cell liquid electrolyte electrochemical sensors. In various embodiments, the electrochemical oxygen pump may employ acid electrolytes and gas diffusion structures for the sensing, counter, and reference electrodes linked to a conventional potentiostatic control circuit. In some embodiments, gas phase diffusion barriers may be employed. Various oxygen sensors may be used in embodiments of the present disclosure, such as a liquid electrolyte electrochemical (e.g., Consumable anode (battery) or fuel cell pump), High Temperature Solid electrolyte electrochemical (e.g., Zirconia or other oxygen ion conductor), and/or Fluorescence Quenching (e.g., ruthenium based dye). While the sensors discussed herein are referred to as oxygen concentration sensors, the sensing devices discussed herein may take the form of partial pressure sensors.

The gas detection apparatus 10 may include, be associated with, or may otherwise be in communication with a communication interface 26, processor 14, a memory device 16, and a sensor assembly 24. In some embodiments, the processor 14 (and/or co-processors or any other processing circuitry assisting or otherwise associated with the processor) may be in communication with the memory device 16 (e.g., a non-transitory memory comprising one or more volatile and/or non-volatile memories). The memory device may be configured to store information, data, content, applications, instructions, or the like for enabling the gas detection apparatus to carry out various functions in accordance with an example embodiment of the present disclosure.

The processor 14 may be embodied in a number of different ways. For example, the processor 14 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 14 may be configured to execute instructions stored in the memory device 16 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

The gas detection apparatus 10 of an example embodiment may also optionally include a communication interface 26 that may be any means such as a device or circuitry embodied in either hardware or a combination of hardware and software that is configured to receive and/or transmit data from/to other electronic devices in communication with the gas detection apparatus, such as by near field communication (NFC) or other proximity-based techniques. Additionally or alternatively, the communication interface may be configured to communicate via cellular or other wireless protocols including Global System for Mobile Communications (GSM), such as but not limited to Long Term Evolution (LTE). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s).

The gas detection apparatus 10 may include a sensor assembly 24, comprising a primary sensing device 20 and a reference sensing device 22. In various embodiments, the primary sensing device 20 and the reference sensing device 22 may each be a sensor capable of determining a concentration of one or more gases within a given area. In various embodiments, the primary sensing device 20 and the reference sensing device 22 may each be a sensor capable of determining a concentration of oxygen in the given area. In some embodiments, the primary sensing device 20 and the reference sensing device 22 may be similar sensors (e.g., each may be a electrochemical oxygen pump). Alternatively or additionally, the primary sensing device 20 and the reference sensing device 22 may be different types of oxygen sensors. In such embodiments, the gas detection apparatus 10 may be configured to normalize the oxygen level readings of each sensing device in order to properly compare the oxygen levels. In various embodiments, the position of the sensing devices may be based on the expected flow path of a leak (e.g., dynamic fluid path).

In various embodiments, the oxygen concentration levels of a given area may change due to various environmental changes, as well as any gases introduced into the area, such as refrigerant due to a refrigerant leak. The primary sensing device 20 may be located in a region close to the likely source of a leak, taking due account of the fact that refrigerant gases (e.g., A2L refrigerant) are much heavier than air and will therefore tend to sink. For example, the density of air at 20 degrees Celsius may be approximately 1.2 kilograms per cubic meter, while the density of refrigerants may be substantially more dense at the same temperature (e.g., saturated R32 vapor may have a density of 40.8 kilograms per cubic meter and R410 may have a density of 57.6 kilograms per cubic meter). The reference sensing device 22 may be mounted in a location where the reference sensing device will experience lower concentrations of any leaking refrigerant and hence smaller and slower oxygen depletion (if any). Slower long term background changes should still be well compensated under this arrangement, although there is some concern that if the target area is close to components whose temperature fluctuates rapidly, the efficiency of the compensation could be compromised. As discussed below, the primary sensing device 20 and the reference sensing device 22 may be configured (e.g., through sensor placement and/or the use of target gas filtering) to have different oxygen concentration level readings in an instance in which a gas leak (e.g., refrigerant leak) is present. Additionally, the primary sensing device 20 and the reference sensing device 22 may be configured to have similar oxygen concentration level readings in an instance in which no gas leak is occurring (e.g., the sensing devices may be subjected to similar environmental conditions, such that any changes in the environmental conditions may cause corresponding changes in both sensing devices).

In various embodiments, the reference sensing device 22 may be used to compensate for changes in temperature, pressure, humidity etc. Various embodiments may also use additional external compensating devices for one or more environmental condition. In various embodiments, the output of the primary sensing device 20 may be corrected based on the environmental conditions observed.

Figure 2:
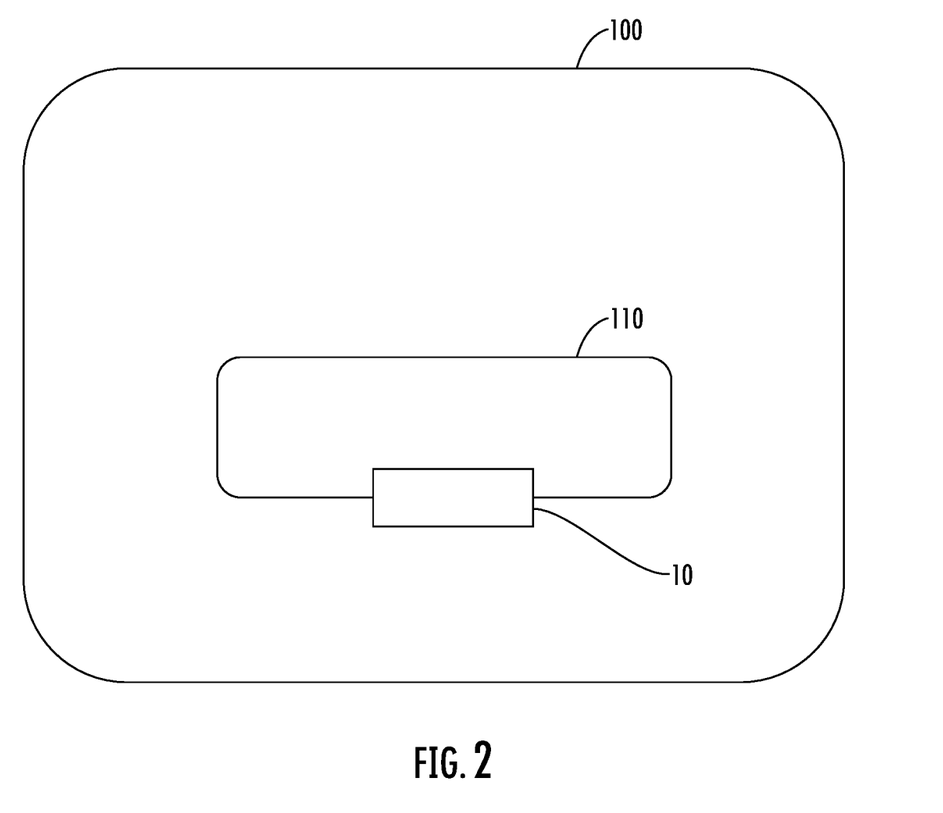
FIG. 2 is block diagram of a refrigeration unit, including the gas detection apparatus of FIG. 1, in accordance with an example embodiment of the present disclosure.

FIG. 2 illustrates an example refrigeration unit 100 in accordance with various embodiments of the present disclosure. As shown, the refrigeration unit 100 may include one or more closed-loop gas (e.g., refrigerant) coils 110 and a gas detection apparatus 10 (e.g., a sensor assembly 24 and a processing circuitry 12). In various embodiments, at least a portion of the gas detection apparatus 10 may be disposed in proximity to the given closed-loop gas coil 110 within the refrigeration unit 100. For example, at least the sensor assembly 24 (shown in FIG. 1) may be proximate to the closed-loop gas coils 110 and the processing circuitry 12 may be disposed elsewhere.

In various embodiments, the gas detection apparatus 10 may be placed in sufficient proximity, such that a leakage of gas (e.g., refrigerant) may result in a change of the oxygen concentration. In some embodiments, the gas detection apparatus 10 may be disposed at a location proximate to an area of the closed-loop gas coils 110 in which leakages occur more than other locations. For example, gas leaks may occur more often at connection between different tubing. In various embodiments, the gas detection apparatus 10 may be disposed with the refrigeration unit or the like, such that any gas leak may reach the gas detection apparatus 10.

Figure 3:
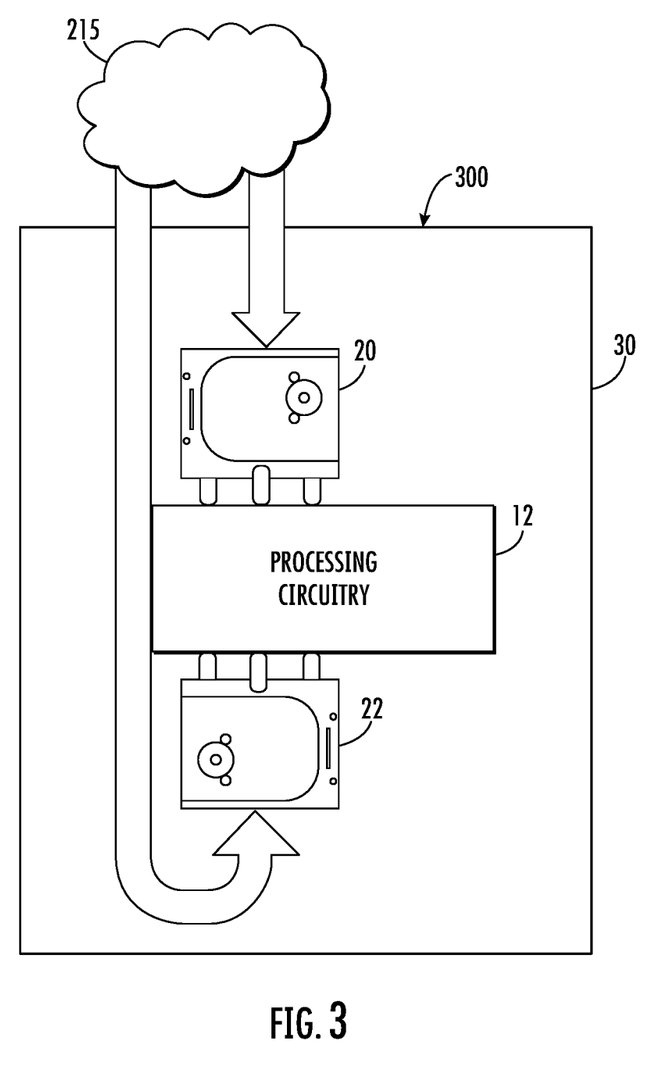
FIG. 3 is an example configuration of the gas detection apparatus for use in accordance with an example embodiment of the present disclosure.

FIG. 3 is an example configuration of the gas detection apparatus 10 in accordance with an example embodiment. As shown, the primary sensing device 20 and the reference sensing device 22 may be disposed within the same housing 30. In various embodiments, the gas detection apparatus 10 may be oriented such that the coil surface 300 is proximate to the coil 110 and a gas (e.g., refrigerant) leakage 215 in an instance such a leakage occurs. As such, the primary sensing device 20 may be disposed at a first position and the reference sensing device 22 may be disposed at a second position. In various embodiments, the first position (e.g., the location of the primary sensing device 20 may be proximate to a potential leak 215 and the second position (e.g., the location of the reference sensing device 22) may be distant to a potential leak. In some embodiments, there may be a trade-off in performance between the leak location, gas movement, sensor location, sensitivity, and response time of the sensing device. In some embodiments, such as a refrigeration unit, the first position may be less than 1 meter from the potential leak 215. In some embodiments, the first position may be less than 0.75 meters from the potential leak 215. In some embodiments, the first position may be less than 0.5 meters from the potential leak 215. In some embodiments, the first position may be less than 0.25 meters from the potential leak 215. In some embodiments, the second position may be greater than the first position, but less than 1 meter from the potential leak 215. In some embodiments, the second position may be greater than the first position, but less than 0.75 meters from the potential leak 215. In some embodiments, the second position may be greater than the first position, but less than 0.5 meters from the potential leak 215. In some embodiments, the second position may be greater than the first position, but less than 0.25 meters from the potential leak 215. In various embodiments, at least one of the first position or the second position may be greater than 1 meter from the potential leak 215, in an instance in which the first position and/or second position is still within the flow path of the leakage gas.

In various embodiments, the first position may be closer to the coil surface 300 than the second position and therefore any gas leakage 215 may reach the primary sensing device 20 before the reference sensing device 22. As such, the first oxygen concentration level reading captured by the primary sensing device 20 may be altered due to the gas leak (e.g., the oxygen concentration may decrease) before the second oxygen concentration level reading captured by the reference sensing device 22 is altered. As such, in an instance in which a leakage is occurring, the first oxygen concentration level reading may decrease more quickly than the second oxygen concentration level reading.

In some embodiments, such as shown, the reference sensing device 22 may also be oriented differently from the primary sensing device 20, such that the gas flowing from the potential leak does not access the reference sensing device 22 as easily as the primary sensing device 20 (e.g., as the arrows in FIG. 3 shown, the target gas may flow directly into the primary sensing device 20, but may have to travel around the processing circuitry 12 to access the reference sensing device 22). As such, the temporal effect of the gas flow may be more definitively shown by the outputs of each sensing device. In various embodiments, the location of the first position and the second position may be based on the expected flow path of a potential leak. In some embodiments, a potential leak may be defined as an area susceptible to leakage. For instance in a refrigeration unit, the potential leakage locations may include braised joints, connections between tubing, areas under mechanical and/or thermal stress, and/or the like. In various embodiments, the potential leakage location may be determined via testing of specific applications.

In some embodiments, the reference sensing device 22 may be disposed outside of the housing 30, such that the reference sensing device 22 may not receive any of the target gas during a leakage instance. In such an instance, the reference sensing device 22 may be located in an area with similar environmental conditions to the position of the primary sensing device 20. While FIG. 3 shows only a single primary sensing device 20 and a single reference sensing device 22, various embodiments may use more than two sensing devices disposed at different locations. For example, multiple reference sensing devices 22 may be positioned at various positions from the potential leak and as such may experience changes to the reading at different times during a leakage instance.

In various embodiments, at least a portion of the processing circuitry 12 may be disposed within the gas detection apparatus 10 (e.g., in the same housing 30 as the primary sensing device 20 and the reference sensing device 22). As shown, the primary sensing device 20 and/or the reference sensing device 22 may be connected to the processing circuitry 12 via pins on the sensing devices configured to engage with sockets on the processing circuitry 12. Various embodiments may employ different connection methods, such as pads configured on the sensing devices and pogo pins on the processing circuitry 12. Various embodiments discussed herein may have any number of different standard electrical interconnects between the sensing devices and the processing circuitry 12. In some embodiments, the primary sensing device 20 and/or the reference sensing device 22 may be equipped with short range communication capabilities to allow the sensing devices to communicate with the processing circuitry 12 remotely. In various embodiments, the processing circuitry 12 may be configured to receive oxygen concentration level readings from the primary sensing device 20 and the reference sensing device 22. In some embodiments, the processing circuitry 12 may store one or more of the oxygen concentration level readings, such that the oxygen concentration level readings may be monitored over time (e.g., the first oxygen concentration level readings and the second oxygen concentration level readings may diverge over time due to a leak). In some embodiments, time sequence data may be used to determine leak instances. In various embodiments, the monitoring may be continuous. Alternatively, the monitoring may occur at intervals based on the gas leakage application (e.g., some gas leaks may not be as dangerous and intermittent monitoring may be cost-saving).

Figure 4:
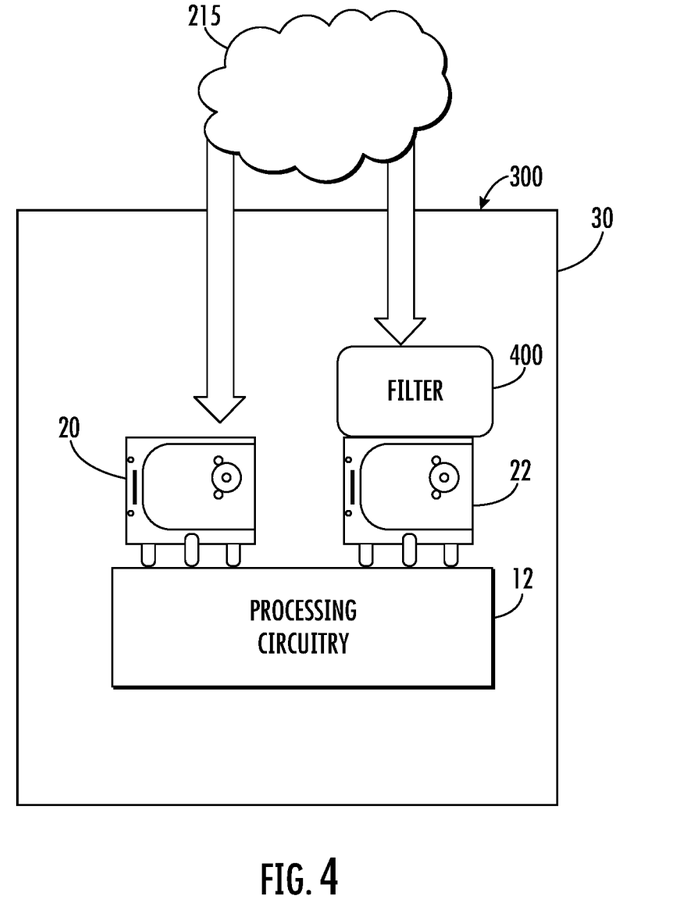
FIG. 4 is another example configuration of the gas detection apparatus for use in accordance with an example embodiment of the present disclosure.

FIG. 4 is another example configuration of the gas detection apparatus 10 in accordance with an example embodiment. As shown, the primary sensing device 20 and the reference sensing device 22 may be disposed within the same housing 30. As shown, the primary sensing device 20 and the reference sensing device 22 may be disposed at a first position and a second position approximately the same distance from the coil surface 300 and as such, the primary sensing device 20 and the reference sensing device 22 may receive any gas (e.g., refrigerant) from a leak at approximately the same time.

In some embodiments, the reference sensing device 22 may be equipped with a filter 400 configured to remove one or more target gases (e.g., refrigerants) from the gas entering the reference sensing device 22. In some embodiments, the filter 400 may be configured to absorb one or more target gases (e.g., refrigerant gases) that pass therein. For example, the filter 400 may be an absorber. In some embodiments, the filter 400 may be positioned between the closed-loop gas coil 110 and the reference sensing device 22, such that any gas combination that reaches the reference sensing device has passed through the filter 400 (e.g., removing some or all of the refrigerant gas).

In various embodiments, the filter 400 may be activated carbons of various types. In some such embodiments, the activated carbons may be impregnated with other chemicals depending on the species to be absorbed. In some embodiments, molecular sieves, zeolites, and/or other well know filter families may be used. In some embodiments, the target gas may dictate the design of the filter 400 (e.g., Sofnocarb powder may be used in an instance in which Butane is the target gas). In some embodiments, the filter 400 may be designed to permanently absorb the target gas or simply to slow down its passage to the reference sensing device, such that a temporal difference arises in the response compared to the primary sensing device.

In some embodiments, the primary sensing device 20 and the reference sensing device 22 may be a single sensor with a plurality of gas feeds. For example, the single sensor may have a primary sensing device gas feed without a filter 400 and a reference sensing device gas feed that may have a filter 400. In such an embodiment, the sensing device may have a mechanical switch configured to alternate access to a sensing electrode from the primary sensing device gas feed to the reference sensing device gas feed during operation. In such an embodiment, various pumping devices may be used to move the gas from the gas feeds to the sensing electrode. During operation, the mechanical switch may alternate between the primary sensing device gas feed and the reference sensing device gas feed and the differences between the first oxygen level reading from the primary sensing device gas feed and the second oxygen level reading may be compared as discussed herein with a two sensing device system.

In some embodiments, as gas (e.g., refrigerant) leaks, the first oxygen concentration level reading of the primary sensing device 20 may begin to decrease, while the second oxygen concentration level reading of the reference sensing device 22 remains approximately constant (or at least decreases more slowly). In some instances in which a gas leak is sufficiently large, the filter 400 may be become overwhelmed (e.g., fully saturated) at a specific point, such that the second oxygen concentration level reading of the reference sensing device 22 may begin to decrease in line with a sensing device without a filter. In such an embodiment, the time lag between the decrease of the first oxygen concentration level and the second oxygen concentration level may indicate that a gas leakage is occurring. Additionally, various other information may be determined via the individual outputs of the sensing devices.

In various embodiments, at least a portion of the processing circuitry 12 may be disposed within the gas detection apparatus 10 (e.g., in the same housing 30 as the primary sensing device 20 and the reference sensing device 22). As shown, the primary sensing device 20 and/or the reference sensing device 22 may be connected to the processing circuitry 12 via pins on the sensing devices configured to engage with sockets on the processing circuitry 12. Various embodiments may employ different connection methods, such as pads configured on the sensing devices and pogo pins on the processing circuitry 12. Various embodiments discussed herein may have any number of different standard electrical interconnects between the sensing devices and the processing circuitry 12. In some embodiments, the primary sensing device 20 and/or the reference sensing device 22 may be equipped with short range communication capabilities to allow the sensing devices to communicate with the processing circuitry 12 remotely. In various embodiments, the processing circuitry 12 may be configured to receive oxygen concentration level readings from the primary sensing device 20 and the reference sensing device 22. In some embodiments, the processing circuitry 12 may store one or more of the oxygen concentration level readings, such that the oxygen concentration level readings may be monitored over time (e.g., the first oxygen concentration level readings and the second oxygen concentration level readings may diverge over time due to a leak). In various embodiments, the monitoring may be continuous. Alternatively, the monitoring may occur at intervals based on the gas leakage application (e.g., some gas leaks may not be as dangerous and intermittent monitoring may be cost-saving).

Figure 5:
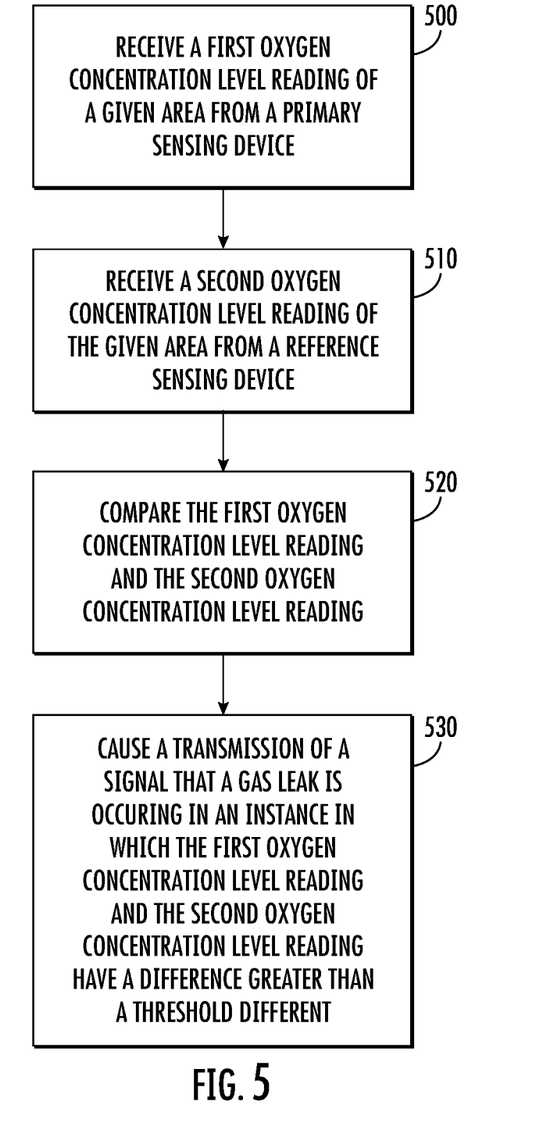
FIG. 5 is a flowchart illustrating the operations performed, such as by the gas detection apparatus of FIG. 1, in accordance with an example embodiment of the present disclosure.

Referring now to FIG. 5, an example embodiment of the present disclosure includes a flow diagram for the processing circuitry 12, the processor 14, the sensor assembly 24, or the like, to monitor and detect a gas (e.g., refrigerant) leak. While various embodiments of the gas detection apparatus may include at least one processor 12, various embodiments of the gas detection apparatus may be analog systems, such that the primary sensing device 20 and the reference sensing device 22 may be in communication with a differential amplifier and/or ratio amplifier and use a comparator to determine an instance in which a leakage is occurring. As such, the operations of FIG. 5 may be carried out by an analog system.

Referring now to Block 500 of FIG. 5, the gas detection apparatus 10, such as the processing circuitry 12, the processor 14, or the like, may include means for receiving a first oxygen concentration level reading of a given area. In various embodiments, as discussed above, the first oxygen concentration level reading may be captured by the primary sensing device 20. In various embodiments, the first oxygen concentration level reading may be affected by the environmental conditions, such as temperature or the like. Additionally, in some embodiments, the first oxygen concentration level reading may be affected by the introduction of new gases (e.g., such as a gas leak causing the oxygen concentration to decrease).

Referring now to Block 510 of FIG. 5, the gas detection apparatus 10, such as the processing circuitry 12, the processor 14, or the like, may include means for receiving a second oxygen concentration level reading of the given area. In various embodiments, as discussed above, the first oxygen concentration level reading may be captured by the reference sensing device 22. In various embodiments, the reference sensing device 22 may be positioned in similar environmental conditions, such that the effects of the environmental conditions on the second oxygen concentration level reading may be similar or the same to the effects of the environmental conditions on the first oxygen concentration level reading.

In various embodiments, however, the reference sensing device 22 may be configured such that a gas leak 215 may have a different effect on the second oxygen concentration level reading from the reference sensing device 22 than on the first oxygen concentration level reading from the primary sensing device 20. For example, in an instance in which the reference sensing device 22 is positioned at a second position farther away from the coil surface 300 than the primary sensing device 20 (e.g., FIG. 3), the second oxygen concentration level reading may begin to decrease a time after the first oxygen concentration level reading begins to decrease, as the gas (e.g., refrigerant) may take longer to reach the reference sensing device 22. Alternatively, in an instance in which the reference sensing device 22 is equipped with a filter 400 (e.g., FIG. 4), the second oxygen concentration level may not decrease, at least for an amount of time until the filter is saturated, due to a gas leak, while the first oxygen concentration level may decrease due to said gas leak.

Referring now to Block 520 of FIG. 5, the gas detection apparatus 10, such as the processing circuitry 12, the processor 14, or the like, may include means for comparing the first oxygen concentration level reading and the second oxygen concentration level reading. In various embodiments, the difference in the first oxygen concentration level reading and the second oxygen concentration level reading may correlate to the amount of gas leakage. In some embodiments, the comparison may be at a given time (e.g., at an instance in which the primary sensing device 20 has a lower oxygen concentration level reading than the reference sensing device 22). In some embodiments, the first oxygen concentration level reading and the second oxygen concentration level reading may be monitored over time, such that changes in the first oxygen concentration level reading and the second oxygen concentration level reading may indicate that a gas leak is occurring.

In an example analog embodiment, the primary sensing device 20 and the secondary sensing device 22 may measure an output current, that is converted to a voltage, the individual output voltages may be amplified to eliminate any noise. As such, the voltages may be compared using either a differential or a ratio. In such an analog embodiment, a comparator may be used to determine a leak has occurred.

Referring now to Block 530 of FIG. 5, the gas detection apparatus 10, such as the processing circuitry 12, the processor 14, or the like, may include means for causing a transmission of a signal that a gas (e.g., refrigerant) leak is occurring in an instance in which the first oxygen concentration level reading and the second oxygen concentration level reading have a difference greater than a threshold difference. In various embodiments, the determination that a gas leak may be occurring may be based on the comparison of the first oxygen concentration level reading and the second oxygen concentration level reading. In some embodiments, the amount of target gas (e.g., refrigerant) allowable to leak may be based on the flammability of said gas. As such, the threshold difference may be lower than the flammability level of the target gas. For example, in an instance the flammability level is 10%, the threshold difference may be 1%. For example, a 1% change in the oxygen concentration (e.g., from 20.9% oxygen concentration to 20.7% oxygen concentration) may indicate 1% leakage gas (e.g., refrigerant) concentration. In various embodiments, the difference between the first oxygen concentration level reading and the second oxygen concentration level reading may correlate to the change in oxygen concentration (e.g., the primary sensing device 20 and the reference sensing device 22 may be configured such that only an introduction of the target gas (e.g., a gas leak) may cause the first oxygen concentration level reading and the second oxygen concentration level reading to differ substantially). In various embodiments, the threshold difference may be between approximately 5% and 10% of the volume of oxygen concentration level.

Figure 6:
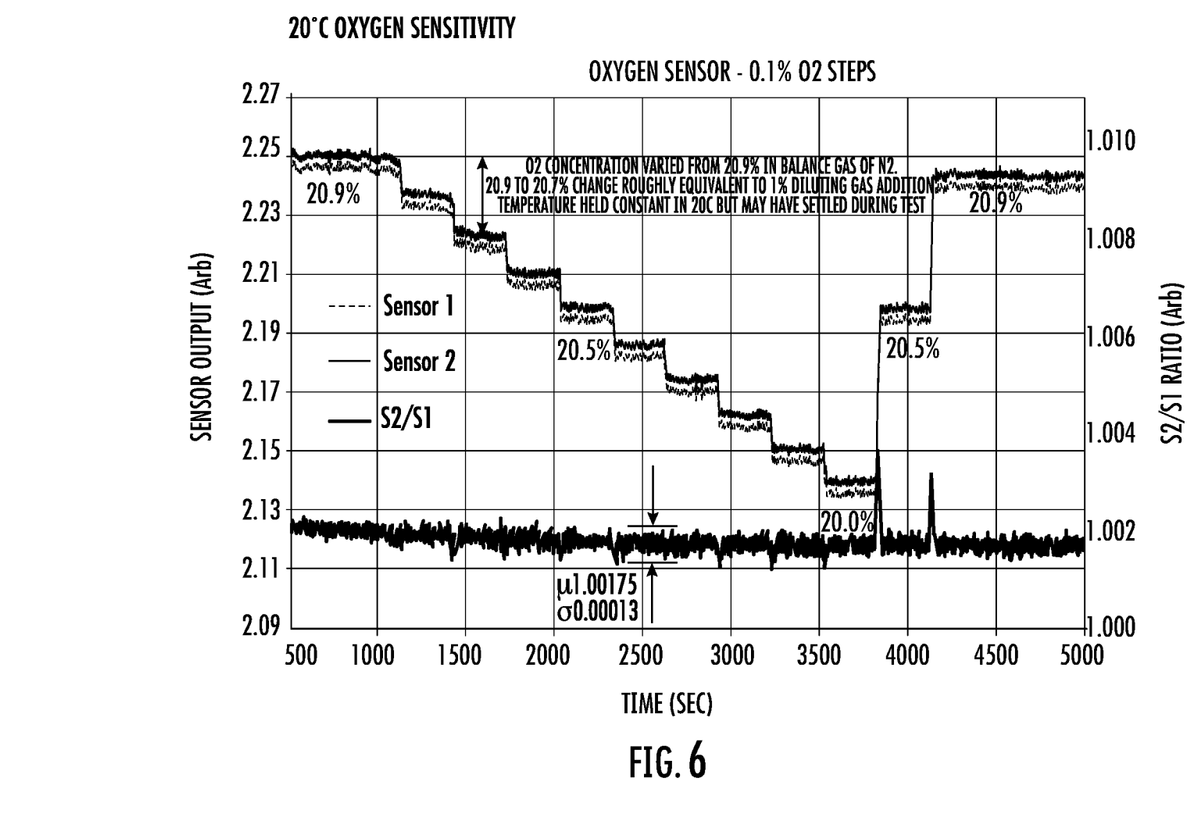
FIG. 6 is a graph showing the voltage outputs of two oxygen sensors during changes in the oxygen concentration level.

FIG. 6 is a graph showing the similar oxygen concentration readings of two sensors, such as the oxygen sensor used in various embodiments herein, during changes to the oxygen level in the air. As shown, the two sensors, which are being exposed to the same air, shown almost identical readings and therefore can be relied upon to shown substantial changes in the oxygen level. The S2/S1 line shown is the ratio of the Sensor 2 reading and the Sensor 1 reading. As shown, the ratio is approximately 1 and therefore any change to one of the sensor readings (e.g., in an instance a gas leakage occur and the primary sensing device 20 experiences a decrease in oxygen before the reference sensing device 22), may be represented by a change of the ratio from approximately 1.

Figure 7:
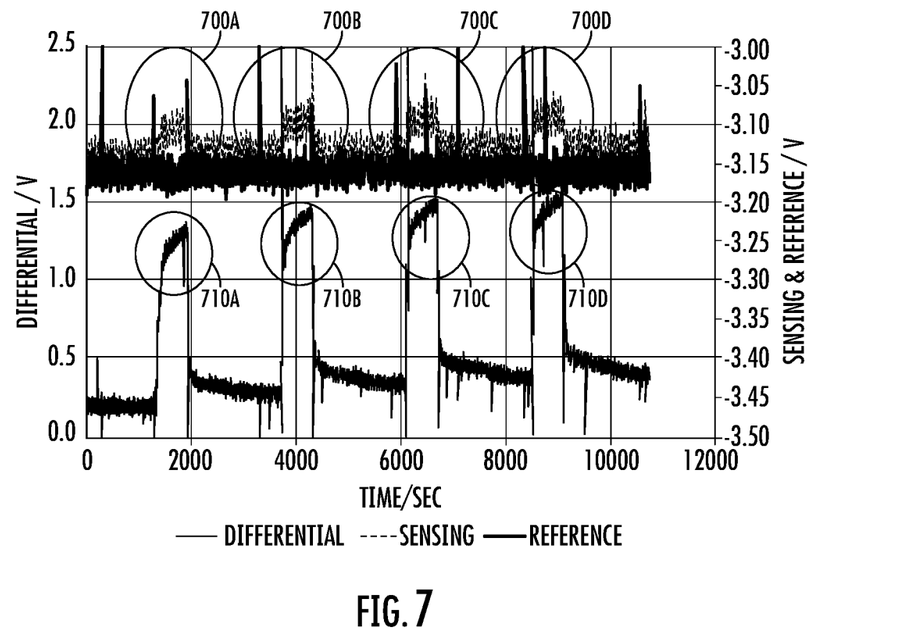
FIG. 7 is a graph showing results of testing using an example embodiment of the present disclosure with Butane being the target gas.

FIG. 7 illustrates the output of a gas detection apparatus, similar to the gas detection apparatus shown in FIG. 4, wherein the reference sensing device 22 is equipped with a target gas filter 400. In the graph shown in FIG. 7, the target gas is butane. As shown, the target gas is intermittently being introduced to the gas detection apparatus and each time the target gas is introduced, the primary sensing device 20 experiences a spike above the nominal voltage (e.g., spikes 700A-700D), while the voltage of the reference sensing device 22 remains approximately constant due to the filter absorbing the butane. In the example shown, a differential is used to show an instance in which a leak is occurring and are shown as spikes 710A-710D.

Various embodiments discussed herein allow for monitoring and detection of gas leaks, such as in refrigeration units during operation. While various embodiments discuss refrigeration units, various embodiments discussed herein may also be used for other types of gas leaks, such as in HVAC applications and/or the like using closed-loop cycles. Refrigeration units include closed-loop refrigerant coils that contain flammable refrigerants. A2L refrigerants are being used more often in such refrigeration units due to a lower global warming potential (GWP) and therefore regulations have been put into place in various countries to monitor leakage to avoid dangerous conditions during use. While A2L refrigerants have generally low toxicity and only mild flammability, large leaks can still cause dangerous situations. Therefore, monitoring and detection of such leaks are necessary for refrigerant units. Various embodiments of the present disclosure allow for a simple, yet effective leakage monitoring system.

As described above, FIG. 5 is a flowchart of various aspects of a gas detection apparatus 10 and method according to example embodiments. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions stored and executable via the memory of the gas detection apparatus.

Blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments set forth herein will come to mind to one skilled in the art to which these disclosures pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method of determining a gas leak with a sensor assembly, the sensor assembly comprising a first gas sensor and a second gas sensor, the method comprising:
   receiving, via the first gas sensor, a first oxygen concentration level reading of a given area;
   receiving, via the second gas sensor, a second oxygen concentration level reading of the given area;
   comparing the first oxygen concentration level reading and the second oxygen concentration level reading; and
   based on the comparison, in an instance in which the first oxygen concentration level reading and the second oxygen concentration level reading have a difference greater than a threshold difference, causing a transmission of a signal that a gas leak is occurring, wherein an orientation of the first gas sensor is different from an orientation of the second gas sensor, wherein the first gas sensor is positioned at a first position and the second gas sensor is positioned at a second position, and wherein the first position is proximate to a leak source as compared to the second position; wherein the gas is a refrigerant.

2. The method of claim 1, wherein the second gas sensor comprises a gas filter configured to screen out one or more target gases from reaching the second gas sensor.

3. The method of claim 1, wherein the sensor assembly is disposed in a refrigeration unit.

4. The method of claim 1, wherein the first gas sensor and the second gas sensor are disposed within a sensor assembly housing.

5. The method of claim 1, wherein the threshold difference is based on between 5% and 10% of the volume of oxygen concentration level.

6. The method of claim 1, wherein the threshold difference is based on a flammability level of the gas.

7. The method of claim 1, further comprising receiving one or more environmental variables and correcting the first oxygen concentration level reading and the second oxygen concentration level reading based on the one or more environmental variables.

8. The method of claim 1, wherein the method is carried out via at least one processor.

9. The method of claim 1, wherein the sensor assembly is an analog system.

10. A gas detection apparatus for determining a composition of one or more gases comprising a sensor assembly comprising a first gas sensor and a second gas sensor, the gas detection apparatus configured to:
    receive, via the first gas sensor, a first oxygen concentration level reading of a given area;
    receive, via the second gas sensor, a second oxygen concentration level reading of the given area;
    compare the first oxygen concentration level reading and the second oxygen concentration level reading; and
    based on the comparison, in an instance in which the first oxygen concentration level reading and the second oxygen concentration level reading have a difference greater than a threshold difference, cause a transmission that a gas leak is occurring, wherein an orientation of the first gas sensor is different from an orientation of the second gas sensor, wherein the first gas sensor is positioned at a first position and the second gas sensor is positioned at a second position, and wherein the first position is proximate to a leak source as compared to the second position; wherein the gas is a refrigerant.

11. The gas detection apparatus of claim 10, wherein the second gas sensor comprises a gas filter configured to screen out one or more gases from reaching the second gas sensor.

12. The gas detection apparatus of claim 10, wherein the sensor assembly is disposed in a refrigeration unit.

13. The gas detection apparatus of claim 10, wherein the first gas sensor and the second gas sensor are disposed within a sensor assembly housing.

14. The gas detection apparatus of claim 10, wherein the threshold difference is based on between 5% and 10% of the volume of oxygen concentration level.

15. The gas detection apparatus of claim 10, wherein the threshold difference is based on a flammability level of the gas.

16. The gas detection apparatus of claim 10, wherein the gas detection apparatus is further configured to receive one or more environmental variables and correct the first oxygen concentration level reading and the second oxygen concentration level reading based on the one or more environmental variables.

17. The gas detection apparatus of claim 10, further comprising at least one processor, the at least one processor having computer coded instructions therein, with the computer instructions configured to, when executed, cause the operations of the gas detection apparatus.

18. The gas detection apparatus of claim 10, wherein the gas detection apparatus is an analog system.

* * * * *